April 23, 1963     T. L. SMITH     3,086,555
PIPE REPAIR CLAMP HAVING JAGGED EDGE ARMOR
Filed May 10, 1961
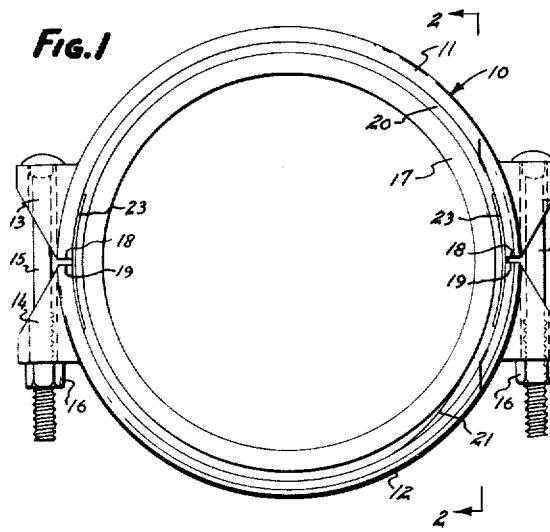
FIG. 1
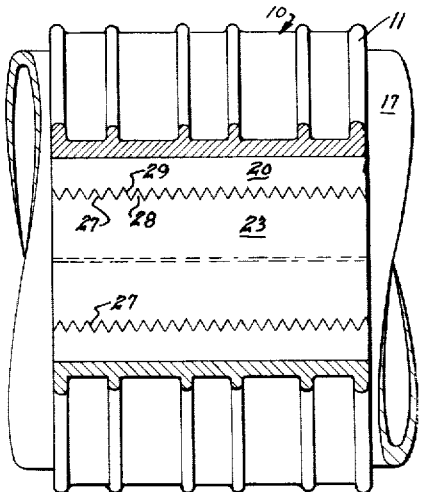
FIG. 2
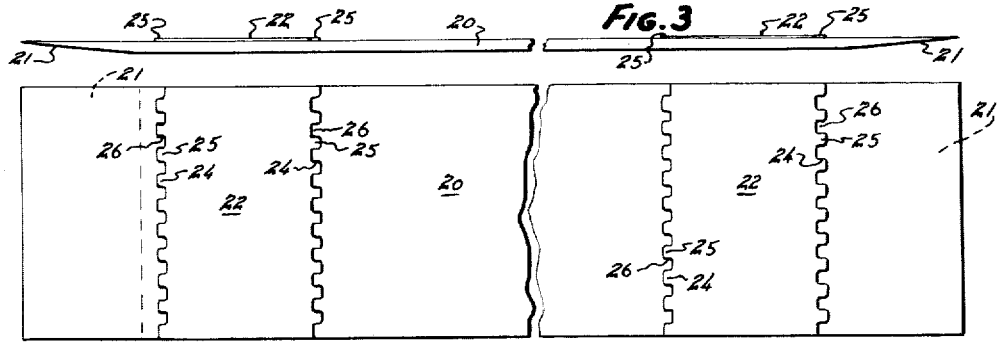
FIG. 3
FIG. 4
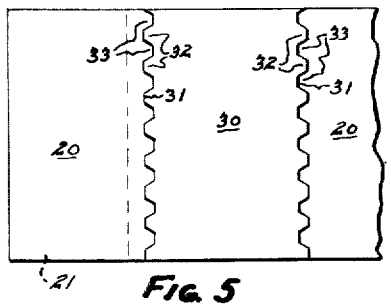
FIG. 5
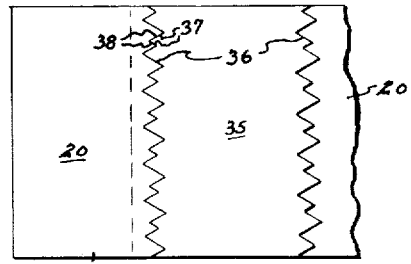
FIG. 6
INVENTOR.
TELFORD L. SMITH
BY
ATTORNEY United States Patent Office 3,086,555
Patented Apr. 23, 1963

3,086,555
PIPE REPAIR CLAMP HAVING JAGGED
EDGE ARMOR
Telford L. Smith, 336 Rider Road, Los Altos, Calif.
Filed May 10, 1961, Ser. No. 109,054
2 Claims. (Cl. 138—99)

This invention relates to improvements in pipe clamps and particularly those employing resilient elastomeric gaskets and having strips to prevent the gaskets from being pinched between parts of the clamps. It also relates to improvements in armored gaskets for pipe repair clamps and the like.

Patent 2,776,153 shows an armored gasket wherein the gasket is recessed to receive a strip of malleable metal which is cemented to the gasket. The strip prevents the clamp from digging into or pinching the gasket and damaging it. The present invention relates to the same general purpose but differs in that the gasket need not be recessed.

Attempts have been made to armor gaskets without recessing the armor strip, but there has always been the difficulty that such a use of a separate strip on the gasket has led to an area along the side edges of the strip against which the clamp does not bear. This has led to leakage.

An important object of the present invention is to provide an armored gasket without recessing the armor strip into the gasket and without causing conditions conductive to leakage. Broadly speaking, the invention accomplishes this object by providing the armor strip with a wavy, jagged, or serrated edge. As a result, the gap between the strip and the gasket, where there is no direct bearing of the clamp, does not lie along a straight line but along the labyrinthine path, and the path is thus going back and forth, always between portions where there is direct bearing. Being always surrounded by these portions, there is no possibility of leakage.

Other objects and advantages of the invention will appear from the following description of some preferred embodiments thereof.

In the drawings:

FIG. 1 is a view in end elevation of a pipe clamp installation embodying the principles of this invention;

FIG. 2 is a view in section taken along the line 2—2 in FIG. 1 with a portion of the pipe broken away to show the gasket and armor combination of this invention;

FIG. 3 is a view in side elevation of the gasket and armor strip;

FIG. 4 is a top plan view of the gasket of FIG. 3 and showing a modified form of armor strip;

FIGS. 5 and 6 are both fragmentary top plan views of portions of gaskets showing modified forms of armored strip.

In FIG. 1 a pipe clam 10 of the split-sleeve type is shown, although the invention applies to malleable-band types of clamps and other clamps. The clamp 10 has two halves 11 and 12, each having lugs 13, 14 that are tightened toward each other by bolts 15 and nuts 16, or other tightening means, to hold a gasket 20 tightly against a pipe 17. In the illustrated clamp 10 there is one gasket 20, meeting itself at tapered ends 21. There could as well be two shorter gaskets with similar ends.

The lugs 13, 14 have facing ends 18 and 19 that face each other and would tend to gouge into the gasket 20 or pinch it between them. To avoid this, the invention provides armour strips 22, 23, 30, or 35 that protect the gasket 20. The strips 22, 23, 30, and 35 are all made from a malleable sheet of metal, e.g., copper. In order to illustrate the fact that the configurations of the strip may vary considerably, several different forms have been illustrated.

The strip 22 (FIGS. 3 and 4) has generally castellated edges 24 with alternating rounded-square teeth 25 and recesses 26. The strip 23 (FIGS. 1 and 2) has sawtooth-like serrated edges 27 with angular teeth 28 and recess 29.

In FIG. 5, a strip 30 has an edge 31 with trapezoidal teeth 32 and recesses 33. In FIG. 6, a strip 35 has serrated edges 36 with teeth 37 and recesses 38 of uneven length and depth.

In all cases, however, the edges are non-rectilinear and generally wavy, serrated. In all cases, the general effect is the same. When the gasket 20 is tightened in the clamp 10, its armor strip 22, 23, 30, or 35 is forced into the gasket body, the resilient elastomeric material flowing elsewhere. Since its own surface tension keeps it from flowing at right angles, there will be a small gap along the edge of the armor strip, where there is nothing for the clamp 10 to bear against. But the wavy, serrated nature of the edge prevents there being a linear gap beneath which the liquid might flow. The wavy serrated path, lying between areas where pressure is applied, does not result in the opposite surface of the gasket having any path along which the fluid could flow.

The armor strip 22, 23, 30, or 35 is preferably cemented to the gasket 20, but in some cases it may be applied loosely, with the same basic effect. Cementing saves time, assures alignment, and gives positive support during installation. In both cases, the general effect is the same—the gasket 20 is protected from being pinched between clamp ends 18 and 19 or being gouged by them, while also no path is provided along which fluid can leak out.

To those skilled in the art to which this invention relates, many changes in construction and widely differing embodiments and applications of the invention will suggest themselves without departing from the spirit and scope of the invention. The disclosures and the description herein are purely illustrative and are not intended to be in any sense limiting.

I claim:

1. A leak-sealing gasket for disposition between a pipe outer wall and a jointed clamp, comprising a sheet of resilient elastomeric material and an armor strip on the outer face of said sheet opposite the clamp joints to prevent scoring, gouging, and pinching of said sheet, the edges of said strip that extend axially of the pipe being wavy, whereby no leakage path for fluid is provided when the strip is compressed into and against the sheet.

2. A pipe repair clamp assembly comprising a jointed clamp; a sheet of resilient elastomeric material disposed between said clamp and the pipe wall; and an armor strip between said sheet and said clamp opposite the clamp joints to prevent them from scoring, gouging, or pinching said sheet, said strip having located along lines that extend generally axially of the pipe, said edges varying back and forth relative to and across said lines so that no linear leakage path for fluid between said sheet and the pipe wall is provided when said strip is compressed into and against said sheet by said clamp.

References Cited in the file of this patent

UNITED STATES PATENTS 2,826,799 Schustack _____ Mar. 18, 1958

UNITED STATES PATENT OFFICE
CERTIFICATE OF CORRECTION

Patent No. 3,086,555                                                    April 23, 1963

Telford L. Smith

It is hereby certified that error appears in the above numbered patent requiring correction and that the said Letters Patent should read as corrected below.

Column 1, line 56, for "clam" read -- clamp --; line 68, for "armour" read -- armor --; column 2, line 59, after "having" insert -- edges --.

Signed and sealed this 31st day of March 1964.

(SEAL)
Attest:
ERNEST W. SWIDER                                                  EDWARD J. BRENNER Attesting Officer                                                    Commissioner of Patents